(12) United States Patent
Wimberly, Jr.

(10) Patent No.: US 7,811,157 B1
(45) Date of Patent: Oct. 12, 2010

(54) PEELER WITH SELF-ADJUSTING ROLLERS

(75) Inventor: James Wimberly, Jr., River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 12/508,241

(22) Filed: Jul. 23, 2009

(51) Int. Cl.
A22C 29/02 (2006.01)
(52) U.S. Cl. .......................................................... 452/5
(58) Field of Classification Search ................ 452/1–11
See application file for complete search history.

(56) References Cited

U.S. PATENT DOCUMENTS

| | | | | |
|---|---|---|---|---|
| 2,537,355 A | * | 1/1951 | Lapeyre et al. ................. | 452/5 |
| 2,778,055 A | * | 1/1957 | Lapeyre et al. ................. | 452/5 |
| 2,832,092 A | * | 4/1958 | Lapeyre et al. ................. | 452/5 |
| 2,886,844 A | * | 5/1959 | Lapeyre et al. ................. | 452/5 |
| 3,704,484 A | * | 12/1972 | Lapeyre et al. ................. | 452/5 |
| 3,706,113 A | * | 12/1972 | Lapeyre et al. ................. | 452/5 |
| 5,108,342 A | * | 4/1992 | Lapeyre et al. ................. | 452/5 |
| 5,120,265 A | * | 6/1992 | Ledet et al. .................... | 452/5 |
| 5,980,373 A | * | 11/1999 | Rosow et al. ................... | 452/5 |
| 6,017,268 A | | 1/2000 | Rosow et al. | |
| 6,248,010 B1 | * | 6/2001 | Sirgo et al. ..................... | 452/5 |
| 6,435,959 B1 | * | 8/2002 | Skrmetta ....................... | 452/5 |

* cited by examiner

Primary Examiner—Thomas Price
(74) Attorney, Agent, or Firm—James T. Cronvich

(57) ABSTRACT

Peeling apparatus and a method for biasing lower idle rollers of a roller-type peeling machine against power rollers to maintain the rollers in contact as the rollers wear. The apparatus includes biasing means, such as a cylinder applying upward pressure against the upper ends of the lower rollers to keep the rollers in constant contact.

9 Claims, 2 Drawing Sheets

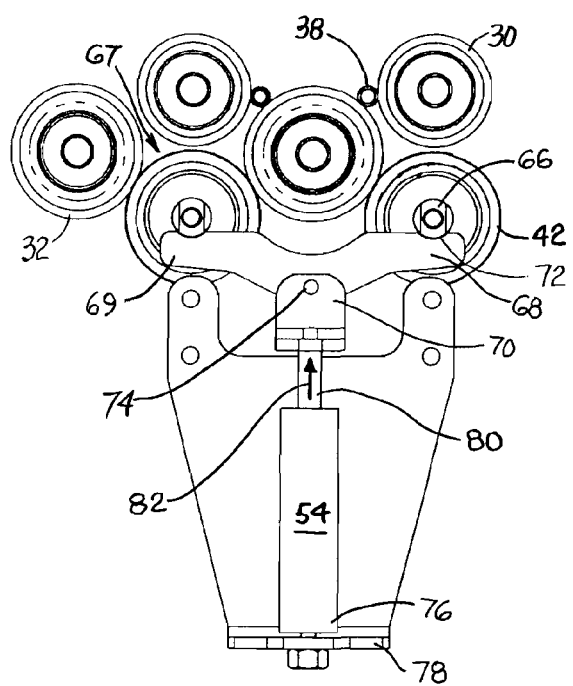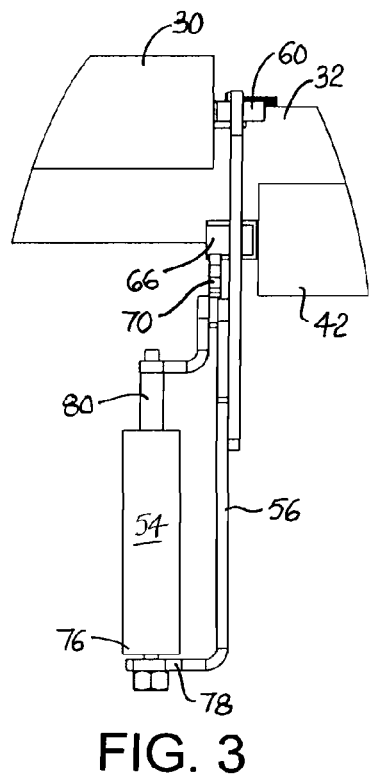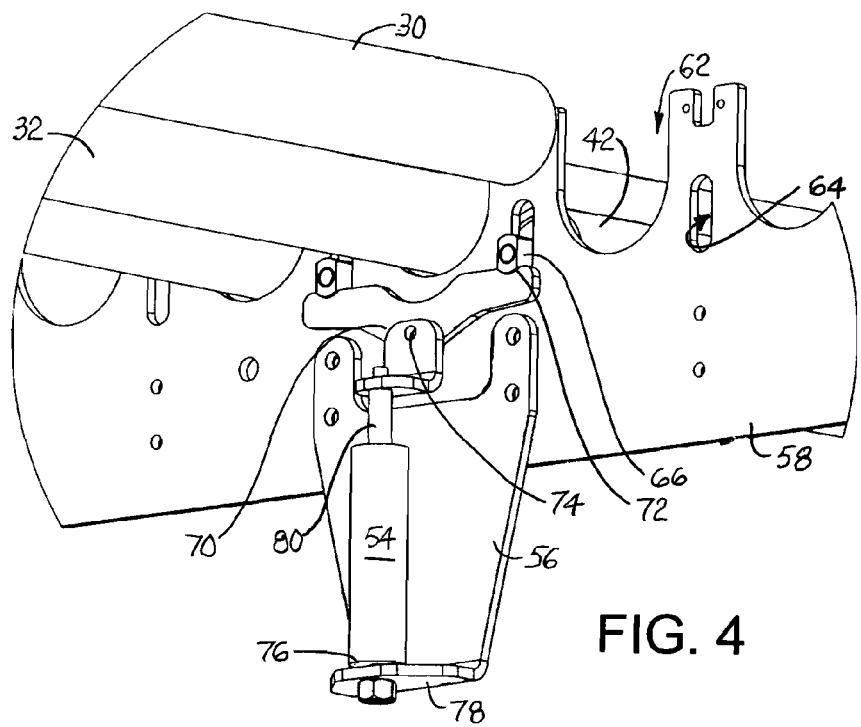

US 7,811,157 B1

PEELER WITH SELF-ADJUSTING ROLLERS

BACKGROUND

This invention relates to peeling apparatus and, more particularly, to roller-type shrimp-peeling machinery with self-adjusting lower rollers.

Originally introduced because of the high labor costs of peeling small shrimp by hand, shrimp peeling machines are now widely used in the shrimp processing industry. Roller-type shrimp-peeling machines, in particular, dominate the bulk shrimp peeling industry. U.S. Pat. Nos. 2,778,055, Jan. 22, 1957, and 2,537,355, Jan. 9, 1951, both to Fernand S., James M., and Emile M. Lapeyre, describe the basic structure and principles of operation of roller-type shrimp peelers.

U.S. Pat. No. 2,778,055 shows a peeling machine with a rigid framework supporting the peeling elements. A transverse beam divides the machine into two peeling sections. The upper peeling section extends from a rear wall to the beam; the lower peeling section extends from the beam to the lower front end of the machine. Shell-on shrimp are fed over the rear wall to the upper peeling section. Channels are formed in the upper peeling section by groups, or associations, of five rollers for each channel. The association of rollers includes a power roller forming the base of the channel, two channel-forming rollers flanking and spaced slightly above the power roller, and two small-diameter insert rollers between the power roller and the channel-forming rollers. The power rollers extend the full length of the machine through both the upper and lower peeling sections. The power rollers are supported in the lower peeling section by base idler rollers, or lower rollers. All the rollers incline downwardly from the rear wall to the front end of the machine. The channel-forming rollers and the insert rollers extend only the length of the upper peeling section and are mounted at the rear wall and at the transverse beam. The power rollers and the channel-forming rollers are mounted in fixed locations so that their peripheries are separated a distance slightly less than the diameter of the insert rollers. In this way, the insert rollers, which are not fixedly mounted as are the power and channel-forming rollers, can be forcibly urged by spring pressure into the gaps between the power and channel-forming rollers. The spring pressure provides a tight nip between the insert roller and the power roller. In the lower peeling section, two power rollers and a base idler roller, or lower roller, at a lower elevation form an inverted triangular lower peeling channel. The power rollers rotate the lower roller by frictional contact. The power rollers rotate in alternate directions to force shrimp in the upper peeling section into the nips on one side of the channel and then into the nips on the other side of the channel. The shrimp are unwrapped of their shells in the nips, the shells falling as waste through the gaps between the power roller and the channel-forming rollers. Most of the peeling is effected in the upper peeling section. Shells not removed in the upper peeling section are further subjected to pinching action between the large-diameter power rollers and the base idler roller in each channel of the lower peeling section.

The power rollers, the channel-forming rollers, and the lower rollers are typically constructed of a metal tube or pipe having a rubber coating. With use, the rubber coating on the power, channel-forming, and lower rollers wears off and the inside surfaces of their axles wear and gaps form between the rollers. In the lower section, where there are no insert rollers, the gaps between the power rollers and the lower rollers affect the peeling grips and degrade performance. The rollers have to be readjusted with respect to one another to reduce the gaps. This is typically done by manually raising the upper ends of the lower rollers. These manual readjustments have to be performed quite often, and the fastening hardware sometimes comes loose because of inadequate tightening and the vibration of the peeler.

BRIEF DESCRIPTION OF THE DRAWINGS

These features and aspects of the invention are better understood by referring to the following description, appended claims, and accompanying drawings, in which:

FIG. 2 is a cross section of FIG. 1 along lines 2-2, showing self-adjusting lower rollers;

FIG. 3 is a side elevation view of the self-adjusting lower rollers of FIG. 2;

FIG. 4 is a perspective view of the self-adjusting lower rollers of FIG. 2; and

DETAILED DESCRIPTION

Figure 1:
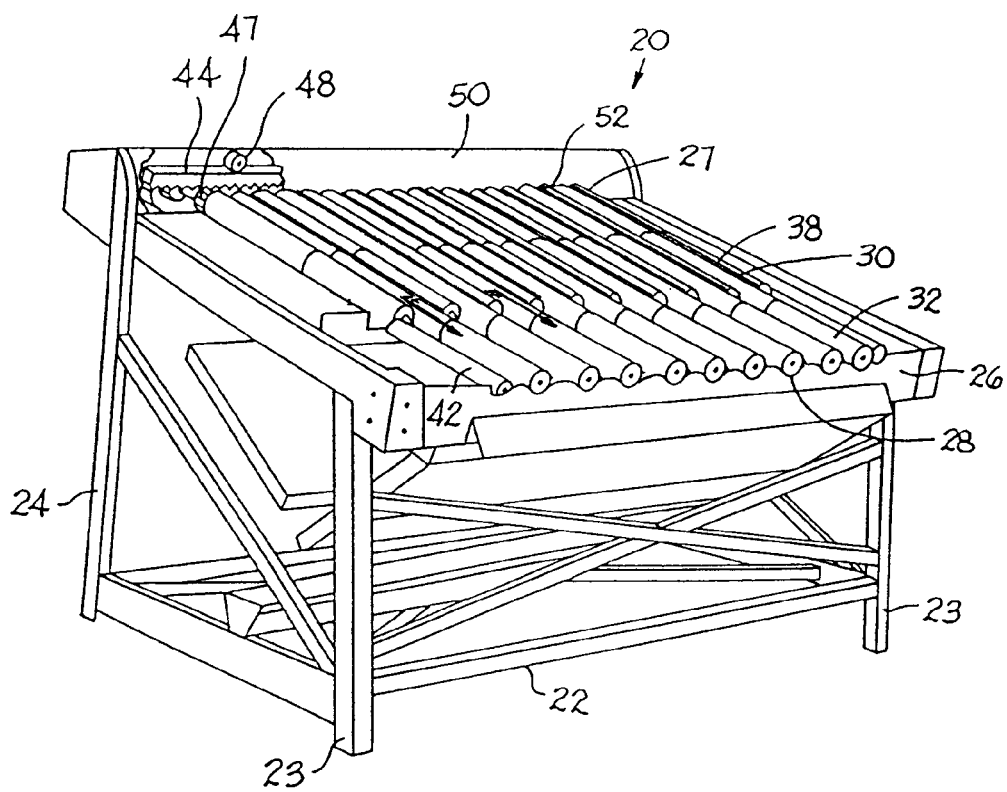
FIG. 1 is a perspective view of a peeling machine embodying features of the invention.

An exemplary version of a peeling apparatus embodying features of the invention is shown in FIG. 1. The peeling apparatus 20, which is typically used to peel shrimp, includes a frame 22 consisting of front and rear legs 23, 24 forming a framework with various cross-bracing and support members. A bed 26 supports peeling rollers that slope downward from a first product-entrance end 27 to a second product-exit end 28. (To simplify the drawing, a finger frame, typically used to urge shrimp into peeling positions, is not shown.) The rollers shown in FIG. 1 include two kinds of powered rollers: channel-forming rollers 30 and power rollers 32. In an upper peeling portion of the peeling apparatus, a plurality of side-by-side peeling channels are formed by a power roller 32 flanked by two channel-forming rollers 30. All three rollers forming each upper channel are powered directly by the peeling apparatus's drive system. Each of these rollers is made of a tube, typically steel, coated with a coating such as a rubber-like material to form an outer peeling surface. The coating could be a polyurethane, as well as other synthetic or natural materials, to provide the peeling effectiveness or durability required by the application. The coating could be left off and the uncoated tube constructed entirely of stainless steel, for instance, with or without a knurled, sandblasted, or otherwise textured surface. The upper peeling channels are further formed by narrow-diameter insert rollers 38 held down into the crotches between the power and channel-forming rollers. The insert rollers rotate by contact with the powered rollers, which are driven alternately clockwise and counterclockwise by the drive system. The insert rollers are typically made of stainless steel with or without surface texturing. The insert rollers are encircled at various positions along the channel by straps 40. The straps, which are attached to the frame, are tensioned by springs, for example, to pull the insert rollers down into the crotches to form peeling nips with the lower roller assembly.

A lower peeling portion of the peeling apparatus is formed by the power rollers 32 supported on lower idle rollers 42, also referred to as lower rollers. Unlike the power rollers and the channel-forming rollers, the lower rollers are passive and rotate only by frictional contact with the power rollers. Like the power rollers, the lower rollers are tubes preferably coated with a rubber-like material. The channel-forming rollers 30 and the insert rollers 38 do not extend down into this lower peeling portion of the apparatus. The peeling nip formed in the lower peeling section produces a peeling action different from that in the upper peeling section. Subjecting product to be peeled, such as shrimp, to both kinds of peeling action produces a more effectively peeled product.

Both the channel-forming rollers 30 and the power rollers 32 are powered at the upper end of the peeling apparatus. A drive system comprising, for example, a rack gear 44 linked to a crank and a pitman arm driven by a motor (not shown) is used to reciprocate the rack gear. A drive member 46, including a toothed gear wheel 47 connected at a first end of each of the powered roller assemblies, meshes with the rack gear. As the rack gear reciprocates, the powered roller assemblies rotate clockwise and counterclockwise in synchrony with the rack. Idler wheels 48, in rolling contact with the upper surface of the rack, retain it in position. A cover plate 50 at the first upper end of the powered roller assemblies may be used to separate the drive system from the peeling channels. Openings 52 formed in the plate admit the drive member portion of the powered roller assemblies into an engagement position with the drive system of the peeling apparatus.

One device for biasing the lower idle rollers against the power rollers in the lower peeling section is shown in FIGS. 2-4. A biasing means, such as a mechanical cylinder 54, is mounted to a mounting bracket 56 affixed to a support 58 that extends across the width of the peeling apparatus. (For clarity, only one cylinder is shown mounted to the support in FIG. 4.) The support supports axles 60 at the lower ends of the channel-forming rollers 30. The support also provides U-shaped openings 62 to accommodate the power rollers 32 and vertical slots 64 that admit axles 66 at the upper ends of the lower idle rollers 42. The support also defines a demarcation between the upper peeling section and the lower peeling section, in which peeling channels 67 are formed between consecutive power rollers 32 and above laterally offset lower rollers 42 flanked by the power rollers. The axles of consecutive lower rollers 42 are supported on opposite arms 68, 69 of a yoke 70. The axles 66 rest on the arms in indentations 72 formed on the tops of each arm. The arms extend outward from a central connection 74. The bottom end 76 of the cylinder is attached to a flange 78 at the bottom of the mounting bracket 56. The piston rod 80 at the top end of the mechanical cylinder is attached to the central connection 74 of the yoke 70. The cylinder 54 extends its piston rod upward, as indicated by arrow 82, pushing against the yoke 70, which biases the lower rollers 42 supported on each arm 68, 69 against the power rollers 32. The vertical slots 64 in the support plate 58 provide a range of adjustment for the axles 66 at the upper ends of the lower rollers 42. As the outer surfaces of the power and lower rollers wears, the cylinder keeps the lower rollers in contact with the power rollers along the length of the lower peeling section by pushing the axles 66 of the lower rollers higher up in the vertical slots 64. By maintaining steady pressure against the upper ends of the lower rollers, the cylinders are self-adjusting to changes in the roller diameters as the rollers wear and to changes in the roller position as the inside surfaces of the axles 66 wear.

Figure 5:
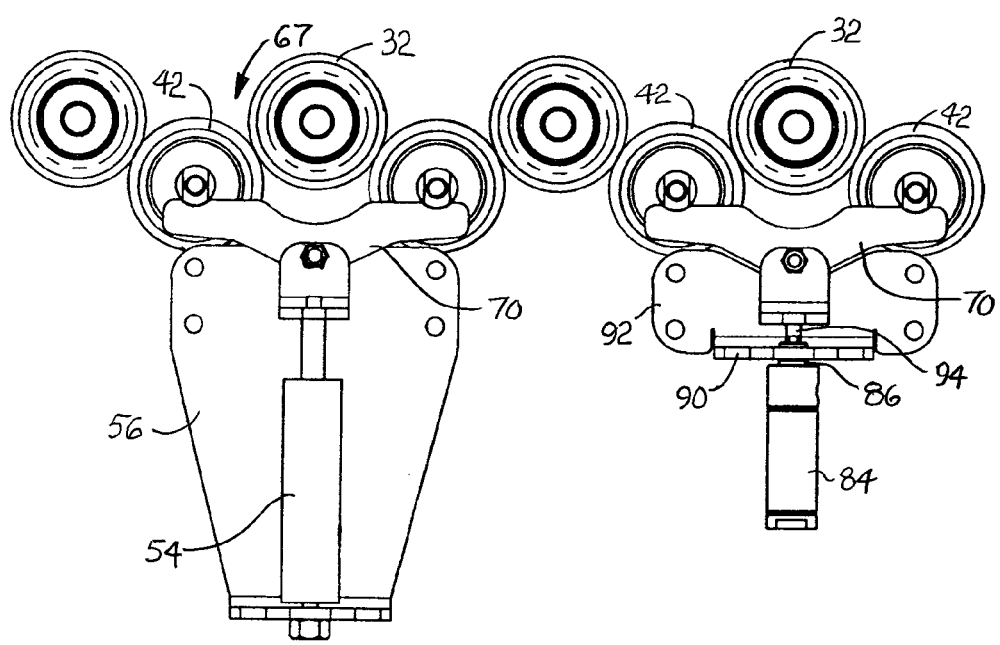
FIG. 5 is an end elevation view looking down the lower peeling section of a peeler as in FIG. 1 and showing two kinds of roller-adjustment mechanisms.

For illustrative purposes, two different kinds of cylinders are shown in FIG. 5. The cylinder on the left is the mechanical cylinder 54 of FIGS. 2-4 mounted in the same way to its mounting bracket 56. The adjacent cylinder is a shorter pneumatic cylinder 84. The pneumatic cylinder is attached at its top end 86 to a horizontal flange portion 90 of a mounting plate 92, which is in turn affixed to the frame support (not shown in this figure). The yoke 70 is the same for both cylinders. The pneumatic cylinder's piston arm 94, which is attached to the yoke, biases the lower idle rollers 42 against the power rollers 32 in the same way as the mechanical cylinder 54.

Although the invention has been described in detail in reference to a couple of preferred versions, other versions are possible. For example, biasing means other than mechanical or pneumatic cylinders may be used. Springs or other elastic members or other kinds of linear actuators that maintain pressure against the lower rollers' axles may be used to make the rollers self-adjusting. As another example, although the yoke described allows one cylinder to be used to bias two lower rollers, longer yokes biasing more than two rollers could be used. Alternatively, the cylinders could be used without yokes, with each lower roller biased by a dedicated cylinder. So, as these few examples suggest, the scope of the claims is not meant to be limited to the details of the preferred versions.

What is claimed is:

1. A peeling apparatus comprising:
    an array of reciprocating power rollers spaced apart laterally across the width of the peeling apparatus;
    an array of lower idle rollers underlying the array of power rollers along a portion of the length of the peeling apparatus at positions below and laterally offset from the power rollers;
    biasing means for maintaining contact between each lower idle roller and two consecutive power rollers.

2. A peeling apparatus as in claim 1 wherein the biasing means is disposed at an end of the lower idle rollers and biases the idle rollers up into contact with the power rollers.

3. A peeling apparatus as in claim 1 wherein the lower idle rollers include axles and the peeling apparatus further includes a support proximate one end on the lower idle rollers and wherein the biasing means comprises at least one cylinder connected between the frame and an end of the axles to bias the lower idle rollers against the power rollers.

4. A peeling apparatus as in claim 3 wherein the at least one cylinder is a mechanical or pneumatic cylinder.

5. A peeling apparatus as in claim 3 wherein the biasing means further comprises a mounting bracket connecting the at least one cylinder to the support.

6. A peeling apparatus as in claim 3 wherein the biasing means further comprises a yoke having two arms extending in opposite directions from a central connection to the cylinder, wherein each arm engages the ends of the axles of consecutive lower idle rollers.

7. A peeling apparatus as in claim 3 wherein the support includes a vertical slot for receiving an end of one of the axles of the lower idle rollers and to allow the lower idle rollers to be pushed farther up into contact with the power rollers as the rollers wear.

8. A method for maintaining contact between a lower idle roller and two consecutive power rollers in a peeling apparatus, the method comprising:
    biasing one end of a lower idle roller upward into contact with two consecutive power rollers.

9. The method of claim 8 comprising:
    biasing one end of two consecutive lower idle rollers into contact with one of the power rollers.

* * * * *